US010043531B1

(12) United States Patent
Shi et al.

(10) Patent No.: US 10,043,531 B1
(45) Date of Patent: Aug. 7, 2018

(54) METHOD AND AUDIO NOISE SUPPRESSOR USING MINMAX FOLLOWER TO ESTIMATE NOISE

(71) Applicant: OmniVision Technologies, Inc., Santa Clara, CA (US)

(72) Inventors: Dong Shi, Singapore (SG); Chung-An Wang, Singapore (SG)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/892,219

(22) Filed: Feb. 8, 2018

(51) Int. Cl.
*H04B 15/00* (2006.01)
*G10L 21/0232* (2013.01)
*G10L 25/78* (2013.01)
*H04R 3/04* (2006.01)
*G10L 21/0316* (2013.01)
*G10L 21/0272* (2013.01)

(52) U.S. Cl.
CPC ...... *G10L 21/0232* (2013.01); *G10L 21/0272* (2013.01); *G10L 21/0316* (2013.01); *G10L 25/78* (2013.01); *H04R 3/04* (2013.01)

(58) Field of Classification Search
CPC ...................................................... H04B 15/00
See application file for complete search history.

(56) References Cited

U.S. PATENT DOCUMENTS

2009/0281800 A1* 11/2009 LeBlanc ............ G10L 21/0208 704/224
2010/0104113 A1 4/2010 Liu
2010/0207689 A1 8/2010 Shimada
2011/0081026 A1 4/2011 Ramakrishnan et al.
2011/0235553 A1 9/2011 Andersson et al.
2013/0013304 A1* 1/2013 Murthy ............... G10L 21/0208 704/226
2014/0316775 A1* 10/2014 Furuta ................ G10L 21/0208 704/226

(Continued)

OTHER PUBLICATIONS

Notice of Allowance in U.S. Appl. No. 15/892,202 dated May 17, 2018, 6 pp.

*Primary Examiner* — Olisa Anwah
(74) *Attorney, Agent, or Firm* — Lathrop Gage LLP

(57) ABSTRACT

A noise-level estimator for a noise suppressor includes a power smoother filter providing smoothed power estimates in timeslices, a minimum follower that represents the lowest smoothed input power, and a maximum follower that represents the highest smoothed input power, the followers subject to leakage factors. The estimator has a speech probability detector receiving outputs of the power smoother and minimum follower; a nonstationary noise detector receiving outputs of both followers; and an estimator receiving outputs of the nonstationary noise detector, power smoother, and speech probability detector and providing a noise estimate. The method includes smoothing intensity of the frequency band; tracking minima and maxima of the smoothed intensity; determining speech-absence probability from the minima and the intensity; determining a nonstationary noise measure from the tracked minima and maxima; determining presence of nonstationary noise; and estimating noise from speech-absence probability, the nonstationary noise measure, and the intensity.

10 Claims, 4 Drawing Sheets

(56) References Cited

U.S. PATENT DOCUMENTS

| | | | | |
|---|---|---|---|---|
| 2015/0127331 | A1* | 5/2015 | Lamy | G10L 21/0208 704/226 |
| 2016/0066087 | A1 | 3/2016 | Solbach et al. | |
| 2016/0086618 | A1 | 3/2016 | Neoran et al. | |
| 2016/0087658 | A1 | 3/2016 | Weissman et al. | |
| 2017/0213539 | A1* | 7/2017 | Magrath | G10K 11/178 |
| 2017/0236526 | A1* | 8/2017 | Choo | G10L 21/0205 704/208 |
| 2017/0337932 | A1 | 11/2017 | Iyengar et al. | |
| 2017/0365275 | A1 | 12/2017 | Lee et al. | |
| 2018/0102135 | A1* | 4/2018 | Ebenezer | G10L 21/0232 |
| 2018/0122399 | A1* | 5/2018 | Janse | G10L 21/0232 |

* cited by examiner

METHOD AND AUDIO NOISE SUPPRESSOR USING MINMAX FOLLOWER TO ESTIMATE NOISE

BACKGROUND

Many communication channels are noisy; this channel noise is added to intended signals and transmitted to a receiver. Further, many communications devices, including cell phones, are used in noisy environments such as crowds, cars, stores, and other places where background music or noise exists; background noises are often picked up by microphones and are effectively added to the intended voice signal and, unless suppressed at the transmitting device, are transmitted to the receiver.

When either or both channel noise or background noise reaches a receiver, this noise can impair intelligibility of intended voice signals unless a noise suppressor is used.

A typical communications system 200 in which an audio noise suppressor may be used is illustrated in FIG. 2. Audio from a human speaker 202 and background noise sources 204 are picked up by a microphone 206, audio from microphone 206 may be processed by a noise suppressor 208 before being transmitted by transmitter 210 into channel 212. Channel noise may be injected into channel 212 by channel noise sources 214, where channel noise may add to a transmitted signal and received by receiver 216 to provide a noisy signal that may be processed by noise suppressor 218 before driving a speaker 220 and being presented to a listener 222.

A conventional noise suppressor 100 (FIG. 1), useable as noise suppressor 208 at the transmitter end of channel 212 or as noise suppressor 218 at the receiver end of channel 212, receives an audio input 102 into a frequency-domain conversion unit 104. Frequency domain signals are divided into separate signals 108 each representing a frequency band of multiple frequency bands by band extractor 106; these separate frequency band signals are provided to a speech detector 110 that determines from the separate frequency band signals if speech is present in the incoming audio. Each frequency band signal is processed further by a separate per-band unit 112 having a noise estimator 114 and signal-to-noise ratio estimator 116 that provides an estimated signal-to-noise ratio 118 to a gain calculator 120. Gain calculator 120 provides a band-specific gain 122 to a variable gain unit 124 that applies band-specific gain 122 to the separate signals 108 representing that frequency band to provide a band-specific gain-adjusted signal 126. The band-specific gain-adjusted signals 126 are collected by a recombiner 128 and converted by an analog or time domain convertor 130 to either an analog domain or a digital time domain audio output signal 132.

Many variations of suppressors derived from the basic suppressor of FIG. 1. These variant noise suppressors often differ in the SNR estimator 116 and gain calculator 120 subsystems. For example, filtering or smoothing may be added at gain calculator 120 outputs to reduce artifacts by stabilizing gain of variable gain unit 124.

Quality of noise suppression using noise suppressors according to FIG. 1, and related noise suppressors, in systems according to FIG. 2 depends on the quality of noise level estimation in noise estimator 114, because incorrect estimates of noise corrupt the SNR in SNR estimator 116, and thus the determined gain 122 for that frequency band.

There are two types of noise commonly found in noisy audio. A first type of noise is "stationary" noise, such as continuous channel noise or a background noises from constantly running fans, flowing water, or a car engine at a constant distance, where the noise tends to have a fairly constant frequency and amplitude distribution. A second type of noise is "non-stationary," variable, noise such as background noise produced by multiple moving automobiles in traffic, several people talking while moving through a crowd, barking dogs, television and radio broadcasts, irritated drivers pressing horn buttons, and other non-constant sources. Much background noise picked up by microphone 206 from audio noise sources 204 is non-stationary.

Typical noise suppressors perform much better on stationary than on non-stationary noise, in part because estimation of noise levels in noise estimator 114 is more difficult with non-stationary noise.

DETAILED DESCRIPTION OF THE EMBODIMENTS

Figure 1:
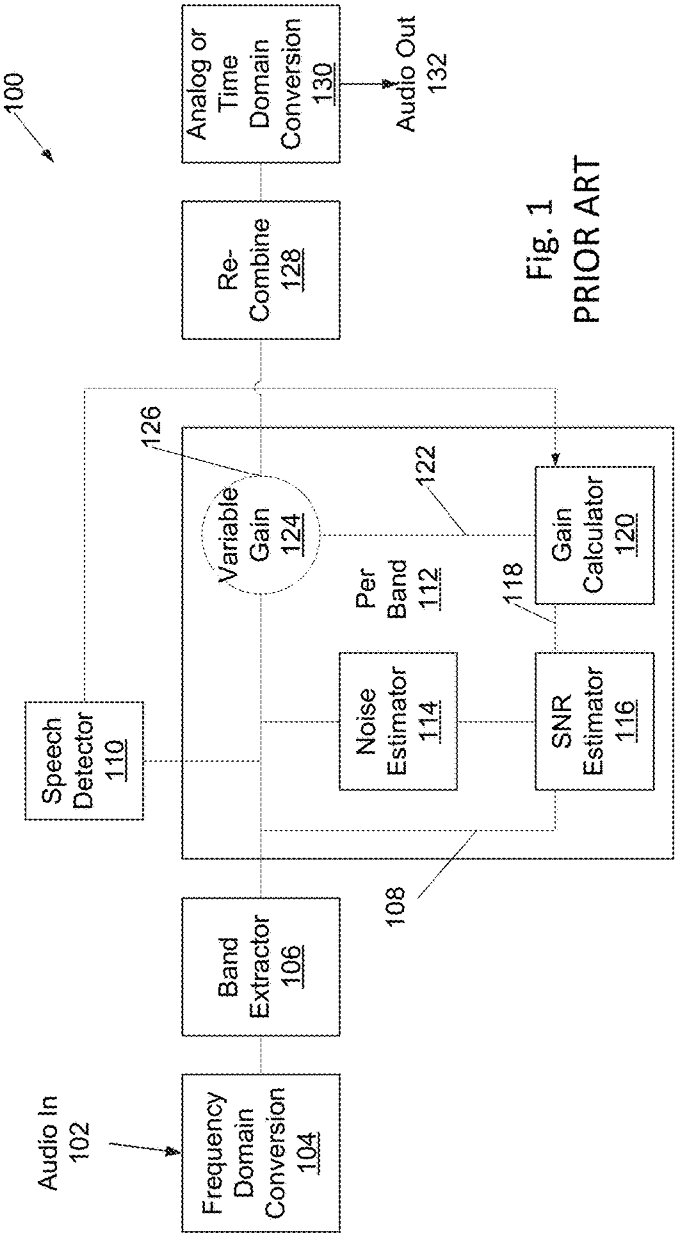
Fig. 1 PRIOR ART
FIG. 1 is a block diagram of a prior-art audio noise suppressor.
Figure 2:
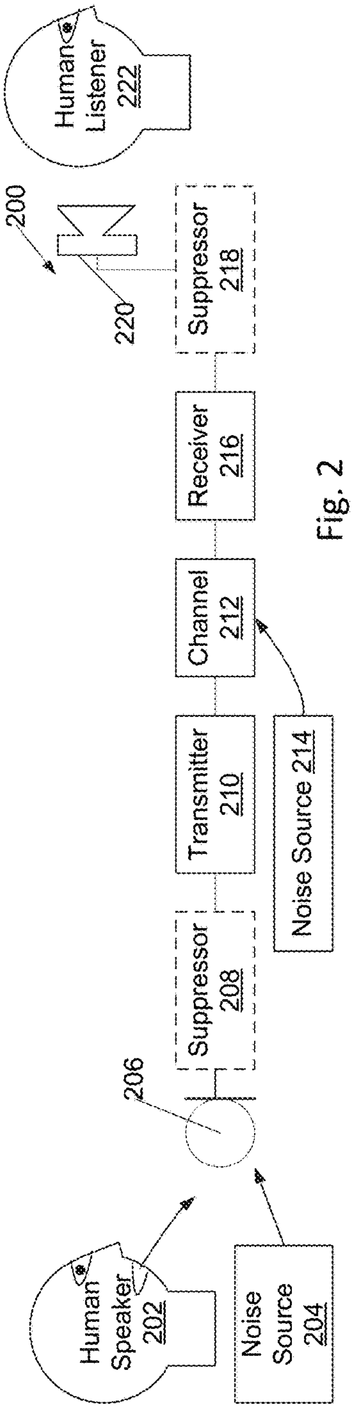
FIG. 2 is a block diagram of a system that may embody one or more audio noise suppressors.
Figure 3:
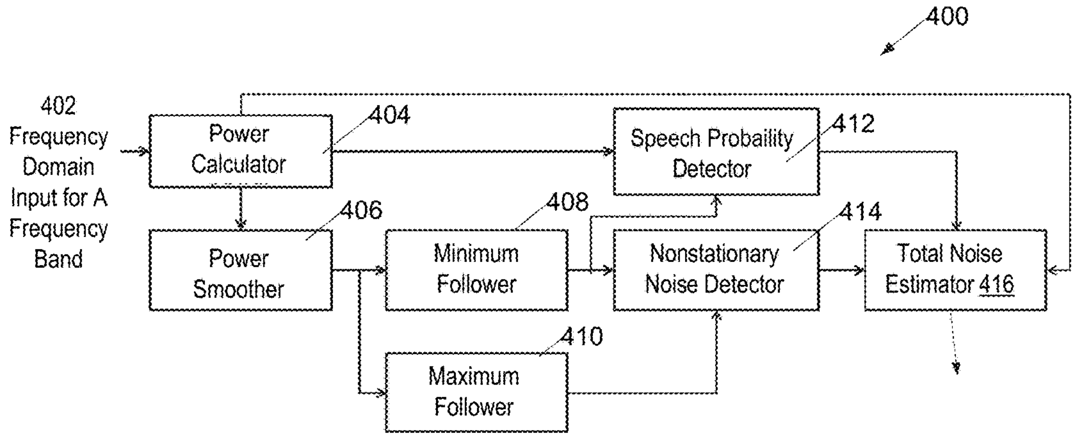
FIG. 3 is a block diagram of an embodiment of a noise estimator for use in audio noise suppressors.

An improved noise estimator 400 for use in each frequency band k of an improved noise suppressor tracks both the minimum and maximum statistics of the signal. Frequency domain input 402 for the frequency band is received and a signal power is calculated in a power calculator 404, this signal power is smoothed in power smoother 406. A minimum follower 408 and a maximum follower 410 tracks the minimum and maximum signal powers respectively over a predefined period of past and use the difference of the tracked values to further compute the speed of noise estimation. In an embodiment, a speech presence probability is computed in speech probability detector 412 based on the tracked minimum and current signal power values. A nonstationary noise detector 414 estimates a probability and magnitude of nonstationary noise and total noise estimator 416 estimates a final total estimated noise power using a smoothing factor, which is determined from the product of the speech of estimation and speech probability and the nonstationary noise estimate.

Denoting $y_k(n)$ as the value of the k-th frequency band for frame n, in power smoother 406 the signal power from power calculator 404 is filtered using a first order recursive filter as $$\sigma_y^2(n)=\alpha_y\sigma_y^2(n-1)+(1-\alpha_y)|y_k(n)|^2 \quad (1)$$

where $\sigma_y^2(n)$ represents the smoothed signal power and $\alpha_y$ is a constant that, for embodiments, lies in the range of 0.3 to 0.5.

The smoothed signal power, or smoother output, is then fed into the minimum 408 and maximum 410 follower for tracking a minimum and maximum of the smoothed signal. The follower and the outputs are computed as:

$$\sigma_{min}^2(n) = \begin{cases} \sigma_y^2(n), \text{ if } \sigma_{min}^2(n) > \sigma_y^2(n) \\ \beta_{min}\sigma_{min}^2(n-1), \text{ otherwise} \end{cases} \text{ and} \quad (2)$$

$$\sigma_{max}^2(n) = \begin{cases} \sigma_y^2(n), \text{ if } \sigma_{max}^2(n) < \sigma_y^2(n) \\ \beta_{max}\sigma_{max}^2(n-1), \text{ otherwise} \end{cases} \quad (3)$$

respectively, where $\sigma_{min}^2(n)$ and $\sigma_{max}^2(n)$ denote the minimum and maximum of the signal history respectively; and $\beta_{min}$ and $\beta_{max}$ are two predefined constants, β_min and β_max being greater than 1 and less than 1, respectively. This requires less memory than the conventional method for tracking signal minima in "Noise power spectral density estimation based on optimal smoothing and minimum statistics", R. Martin, Speech and Audio Processing, IEEE Transactions on, 2001 (Martin); note that Martin does not track signal maximums. Further, Martin uses a history buffer for storing the past values of $\sigma_y^2(n)$ and the minimum in that history buffer is search each frame.

Instead of storing past signal powers $\Gamma_y^2$ in a history buffer we store the current power in a minimum-power register if power is less than a power stored in the minimum power register $\sigma_{min}^2$ and, where current power is not less than the power stored in the register, use a "leakage" factor to increase $\sigma_{min}^2$. Similarly, we store the current power in a maximum-power register $\sigma_{max}^2$ if power is more than a power stored in the maximum power register, as $\sigma_{max}^2$ and, where current power is not more than the power stored in the register, use a "leakage" factor to decrease $\sigma_{max}^2$ frame by frame such that $\sigma_{min}^2$ and $\sigma_{max}^2$ do follow peaks and valleys of the signal power. Here, $\beta_{min}$ and $\beta^{max}$ are predefined constant leakage factors set as values greater than 1 and less than 1, respectively. In a particular embodiment, they are set as:

$$\beta_{min}=10^{3fz/T_{min}} \quad (4)$$

and $$\beta_{max}=10^{-3fz/T_{max}} \quad (5)$$

where fz, $T_{min}$ and $T_{max}$ are the frame duration (in seconds), leakage or relaxation time (in seconds) for minimum follower and leakage or relaxation time for maximum follower, respectively. Here, we set $T_{min}$ and $T_{max}$ as 1 and 0.2 seconds, respectively. And the frame duration is dependent on the actual system implementation and in embodiments lies within the range from 0.01 to 0.032 second.

Figure 4:
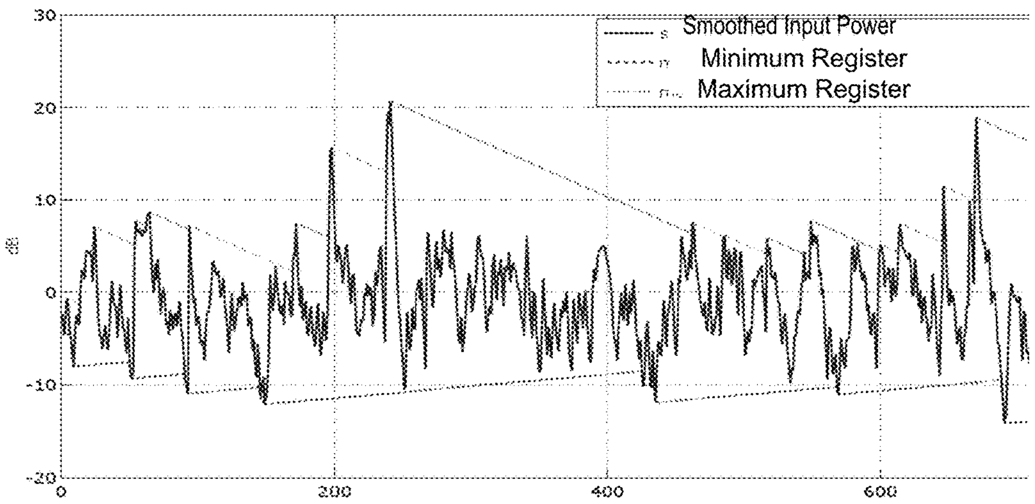
FIG. 4 is an example of filtered input signal power versus tracked minimum and maximum values in an embodiment of the minimum and maximum trackers used within the noise estimator.

FIG. 4 illustrates minimum and maximum levels as tracked by an example of the proposed MinMax follower tracking actual nonstationary noise. It can be seen how the register values evolve with respect to frame (or time) number as the minimum and maximum follower registers slowly increase and decrease, respectively. This is because leakage factors $\beta_{min}$ and $\beta_{max}$ are provided to ensure $\sigma_{min}^2(n)$ and $\sigma_{max}^2(n)$ increase or decrease if the current smoothed signal power is larger or smaller than the register values. Ultimately, as $\sigma_{min}^2(n)$ gets larger and larger, it is more and more likely that it exceeds $\sigma_y^2(n)$ and gets replaced by it. The same rule works for $\sigma_{max}^2(n)$. The proposed MinMax follower does not require additional memories for storing history values and works well in practice.

Nonstationarity Measure

Once $\sigma_{min}^2(n)$ and $\sigma_{max}^2(n)$ are updated, they are used to calculate a nonstationarity measure, defined as $$\gamma(n)=\sigma_{max}^2 x(n)/\sigma_{min}^2(n) \quad (6)$$

Figure 5:
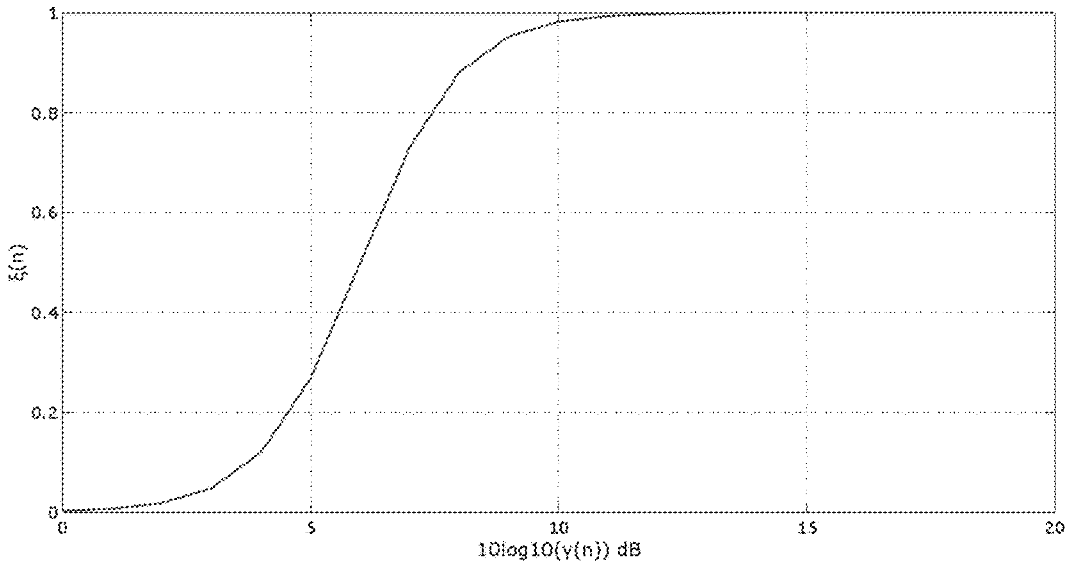
FIG. 5 represents a proposed nonlinear mapping from MinMax ratio to the nonstationarity measure $\gamma$.
Figure 6:
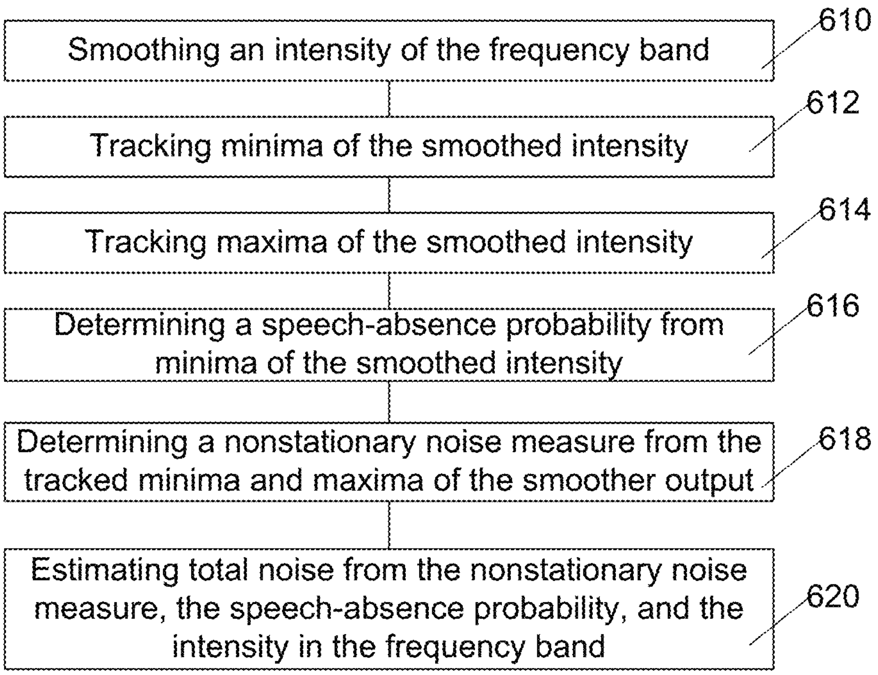
FIG. 6 is a flow chart representing a portion of a method of noise estimation for use in a noise suppressor.

The ratio of the maximum and minimum follower levels gives a measure of how wide the probability density function of the signal power is. For stationary noise, e.g., Gaussian white noise, $\sigma_{min}^2(n)$ and $\sigma_{max}^2(n)$ are the min and max of a Chi-squared distribution with freedom of degree of two. For nonstationary noises, we expect γ(n) to be large since the noise mean varies with time and hence results in higher maximum, lower minimum, or both. This tells how rapidly background noise varies during the current period and we will expect to track the noise in a way that is proportional to its nonstationarity. We map γ(n) to a range between 0 to 1 to reflect how fast we should track the noise, $$\xi(n) = \frac{1}{1 + e^{-(10log10(\gamma(n))-C\gamma)}} \quad (7)$$

where $C_\gamma$ is a predefined constant, in a particular embodiment $C_\gamma$ is 6. ξ(n) is between 0 and 1 and is monotonic with respect to the increase of γ(n). FIG. 5 illustrates the relationship between γ(n) and ξ(n) with $C_\gamma$ being 6 and 10 log 10(γ(n)) ranging from 0 to 20 dB. As illustrated in FIG. 5, once γ(n) exceeds 10 dB, we expect that noise levels will be updated very quickly as ξ(n) is close to 1. It should be pointed out that different frequency bands can use different $C_\gamma$. Thus we shall make $C_{\gamma,k}$ frequency dependent, where k is the frequency band index.

Speech Absence Probability

The noise power is not updated if there is speech for the current frame, if we were to do so we may misadapt the noise power to that of the speech. Speech probability detector 412 therefore uses a function to calculate the speech absence probability $\rho_n(n)$ as $$\rho_n(n) = \begin{cases} 1, \text{ if } \sigma_y^2(n) < C_{min}\sigma_{min}^2 \\ \max(0, \cos(\sigma_y^2(n) - C_{min}\sigma_{min}^2)), \text{ otherwise} \end{cases} \quad (8)$$

where, in a particular embodiment, $C_{min}$ is a constant 4. Eq. (8) and speech probability detector 412 computes a speech absence probability in a way that, if the current signal power is no higher than the minimum follower $\sigma_{min}^2$ by a factor of $C_{min}$, it claims no speech is present. As the signal power rises, $\rho_n(n)$ decreases quickly to zero in a continuous soft way. We found this mapping function works in practice.

Estimate Total Noise Power

The nonstationarity measure in eq. (7) and speech absence probability in eq. (8) are multiplied in total noise estimator 416 to give a smoothing factor for noise estimation as:

$$\alpha_n(n)=\xi(n)\rho_n(n) \quad (9)$$

The total noise power is estimated as $$\sigma_n^2(n)=(1-\alpha_n)\sigma_n^2(n-1)+\alpha_n|y_k(n)|^2 \quad (10).$$

Once the noise power is estimated, it is used to calculate a suppression gain for the current frame to get noise-suppressed speech. The proposed noise estimation scheme is applicable to any kinds of suppression gain equations, such as Wiener filtering, spectral subtraction and etc.

In Wiener noise suppressors of FIG. 1, the suppression gain is applied by adjusting gain of the variable gain circuit 124, and gain-adjusted outputs from each frequency band are combined in recombiner 128 to provide a full frequency-domain audio output. The full frequency-domain audio output is then reconverted to analog or time domain by a conversion unit 130.

Method Restated

The above-described hardware performs a method that can be summarized as follows:

In each frequency band of frequency-domain input from a band extractor, smoothing 610 an intensity of the frequency band to provide a smoother output.

Tracking 612 minima of the smoother output, in a particular embodiment by loading a minimum register to the smoother output in the timeslice if the register content is greater than the smoother output, and increased by a leakage factor if the register content is less than the smoother output, see eqn. (2) above.

Timeslices in embodiments represent about one twentieth to one millisecond. In a particular embodiment a timeslice is one tenth of a millisecond. In embodiments recent timeslices are those within the most recent one to ten seconds. In a particular embodiment, recent timeslices are those having samples that been received and processed within the last approximately two seconds.

Tracking 614 maxima of the smoother output performed, in a particular embodiment by loading a register to the smoother output in the timeslice if the register content is less than the smoother output, and decreased by a leakage factor if the register content is greater than the smoother output, see eqn. (3) above.

Determining 618 a nonstationary noise measure from the tracked minima of the smoother output and the tracked maxima of the smoother output; see eqn. (6) and (7) above.

Determining 616 a speech-absence probability from minima of the smoother output and the intensity of the frequency band using eqn. (8) as given above.

Determining 620 a total noise, see eqn. (9) and (10) above, from the speech-absence probability, the nonstationary noise measure, and the intensity of the frequency band.

In a noise suppressor resembling that of FIG. 1, the method continues with deriving a signal to noise ratio from the estimated noise and the frequency band signal to provide a current SNR, the SNR is used to prepare a raw gain that may be filtered into a current gain. The filtered gain is applied to audio of the frequency band to provide band-specific gain-adjusted, signals. These band-specific, gain-adjusted, signals from all frequency bands are combined into a noise-reduced frequency-domain signal.

Combinations of Features

The features herein disclosed may be combined in a variety of ways. Particular combinations anticipated include:

A noise-level estimator for a noise suppressor, the noise-level estimator designated A including a power smoother low-pass filter that provides a smoothed input power estimate in each timeslice, a minimum follower that provides a representation of the lowest smoothed input power, and a maximum follower that provides a representation of the highest smoothed input power, the followers subject to leakage factors; a speech probability detector coupled to receive outputs of the power smoother and the minimum follower; a nonstationary noise detector coupled to receive outputs of the minimum and maximum followers; and a total noise estimator coupled to receive outputs of the nonstationary noise detector, power smoother, and speech probability detector.

A noise-level estimator designated AA including the noise level estimator designated A wherein the minimum follower uses a register that is set to the smoothed input power estimate in the timeslice if the register content is greater than the smoothed input power estimate, and increased by a leakage factor if the register content is less than the smoothed input power estimate.

A noise-level estimator designated AB including the noise level estimator designated A or AA wherein the maximum follower comprises a register that is set to the smoothed input power estimate in the timeslice if the register content is less than the smoothed input power estimate, and decreased by a leakage factor if the register content is greater than the smoothed input power estimate.

A noise suppressor designated AC including the noise level estimator designated A, AA, or AB, including a band extractor adapted to separating a frequency domain input by frequency band; at least one per-band unit further including the noise-level estimator that receives input representative of a frequency band from the band extractor; a gain calculator coupled to receive an output of the noise-level estimator, and a variable-gain unit controlled by an output of the gain calculator. The noise suppressor also includes a combiner coupled to receive an output of the variable-gain unit of each per-band unit.

A noise suppressor designated AD including the noise suppressor designated AC and further including a time-or-analog domain to frequency domain converter coupled to provide input to the band extractor; and a frequency domain to time-or-analog domain converter coupled to receive output of the combiner.

A method of noise estimation for use in noise suppression designated B includes smoothing an intensity of the frequency band to provide a smoother output; tracking minima of the smoother output; tracking maxima of the smoother output; determining a speech-absence probability from minima of the smoother output and the intensity of the frequency band; determining a nonstationary noise measure from the tracked minima of the smoother output and the tracked maxima of the smoother output; determining presence of nonstationary noise; and estimating total noise from the speech-absence probability, the nonstationary noise measure, and the intensity of the frequency band.

A method of noise estimation designated BA including the method of noise estimation designated B, wherein tracking the minima of the smoother output is performed by loading a minimum register to the smoother output in the timeslice if the register content is greater than the smoother output, and increased by a leakage factor if the register content is less than the smoother output.

A method of noise estimation designated BB including the method of noise estimation designated B or BA, wherein tracking the maxima of the smoother output is performed by loading a register to the smoother output in the timeslice if the register content is less than the smoother output, and decreased by a leakage factor if the register content is greater than the smoother output.

A method of noise suppression designated BC includes separating a frequency domain input by frequency band into frequency band signals; and, for each frequency band signal, estimating noise of the frequency band signal with the method designated B, BA, or BC, then deriving a signal to noise ratio from the estimated noise and the frequency band signal to provide a current SNR, using the SNR to prepare a raw gain, filtering the raw gain to provide a filtered gain, and applying the filtered gain to the frequency band signal to provide band-specific gain-adjusted, signals. The method of noise suppression also includes combining the band-specific, gain-adjusted, signals into a noise-reduced frequency-domain signal.

A method designated BD including the method noise suppression designated BC further including performing a fast Fourier transform (FFT), discrete Fourier transform (DFT) or discrete cosine transform (DCT) to translate an input into the frequency domain input.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A noise-level estimator for use in a noise suppressor comprising:

a power smoother that operates as a low-pass filter and provides a smoothed input power estimate in a timeslice;

a minimum follower that provides a representation of the lowest smoothed input power in recent timeslices, subject to a leakage factor;

a maximum follower that provides a representation of the highest smoothed input power in recent timeslices, subject to a leakage factor;

a speech probability detector coupled to receive an output of the power smoother and an output of the minimum follower;

a nonstationary noise detector coupled to receive outputs of the minimum follower and the maximum follower; and a total noise estimator coupled to receive outputs of the nonstationary noise detector, power smoother, and speech probability detector.

2. The noise level estimator of claim 1 wherein the minimum follower comprises a register that is set to the smoothed input power estimate in the timeslice if the register content is greater than the smoothed input power estimate, and increased by a leakage factor if the register content is less than the smoothed input power estimate.

3. The noise level estimator of claim 1 wherein the maximum follower comprises a register that is set to the smoothed input power estimate in the timeslice if the register content is less than the smoothed input power estimate, and decreased by a leakage factor if the register content is greater than the smoothed input power estimate.

4. A noise suppressor comprising:

a band extractor adapted to separate a frequency domain input by frequency band;

at least one per-band unit further comprising:

the noise-level estimator of claim 1 coupled to receive input representative of a frequency band from the band extractor;

a gain calculator coupled to receive an output of the noise-level estimator, and a variable-gain unit controlled by an output of the gain calculator; and a combiner coupled to receive an output of the variable-gain unit of each per-band unit.

5. The noise suppressor of claim 4 further comprising:

a time-or-analog domain to frequency domain converter coupled to provide input to the band extractor; and a frequency domain to time-or-analog domain converter coupled to receive output of the combiner.

6. A method of noise estimation in a frequency band of a frequency domain signal comprising:

smoothing an intensity of the frequency band to provide a smoother output;

tracking minima of the smoother output;

tracking maxima of the smoother output;

determining a speech-absence probability from minima of the smoother output and the intensity of the frequency band;

determining a nonstationary noise measure from the tracked minima of the smoother output and the tracked maxima of the smoother output;

determining presence of nonstationary noise; and estimating total noise from the speech-absence probability, the nonstationary noise measure, and the intensity of the frequency band.

7. The method of noise estimation of claim 6, wherein tracking the minima of the smoother output is performed by loading a minimum register to the smoother output in the timeslice if the register content is greater than the smoother output, and increased by a leakage factor if the register content is less than the smoother output.

8. The noise level estimator of claim 7 wherein tracking the maxima of the smoother output is performed by loading a register to the smoother output in the timeslice if the register content is less than the smoother output, and decreased by a leakage factor if the register content is greater than the smoother output.

9. A method of noise suppression comprising:

separating a frequency domain input by frequency band into frequency band signals;

for each frequency band signal, estimating noise of the frequency band signal with the method of claim 6, deriving a signal to noise ratio from the estimated noise and the frequency band signal to provide a current SNR, using the SNR to prepare a raw gain, filtering the raw gain to provide a filtered gain, and applying the filtered gain to the frequency band signal to provide band-specific gain-adjusted, signals; and combining the band-specific, gain-adjusted, signals into a noise-reduced frequency-domain signal.

10. The method of claim 9 further comprising performing a fast Fourier transform (FFT), discrete Fourier transform (DFT) or discrete cosine transform (DCT) to translate an input into the frequency domain input.

* * * * *